April 14, 1964  V. A. ALTOVSKY ETAL  3,129,426
DISPLAY-MODIFYING APPARATUS FOR RADAR SYSTEMS
Filed Jan. 9, 1959  2 Sheets-Sheet 1

INVENTORS:
VOLDEMAR A. ALTOVSKY
PIERRE R.J. MONDON
BY PIERRE L.J.L. CAMERINI

Karl G. Ross
AGENT

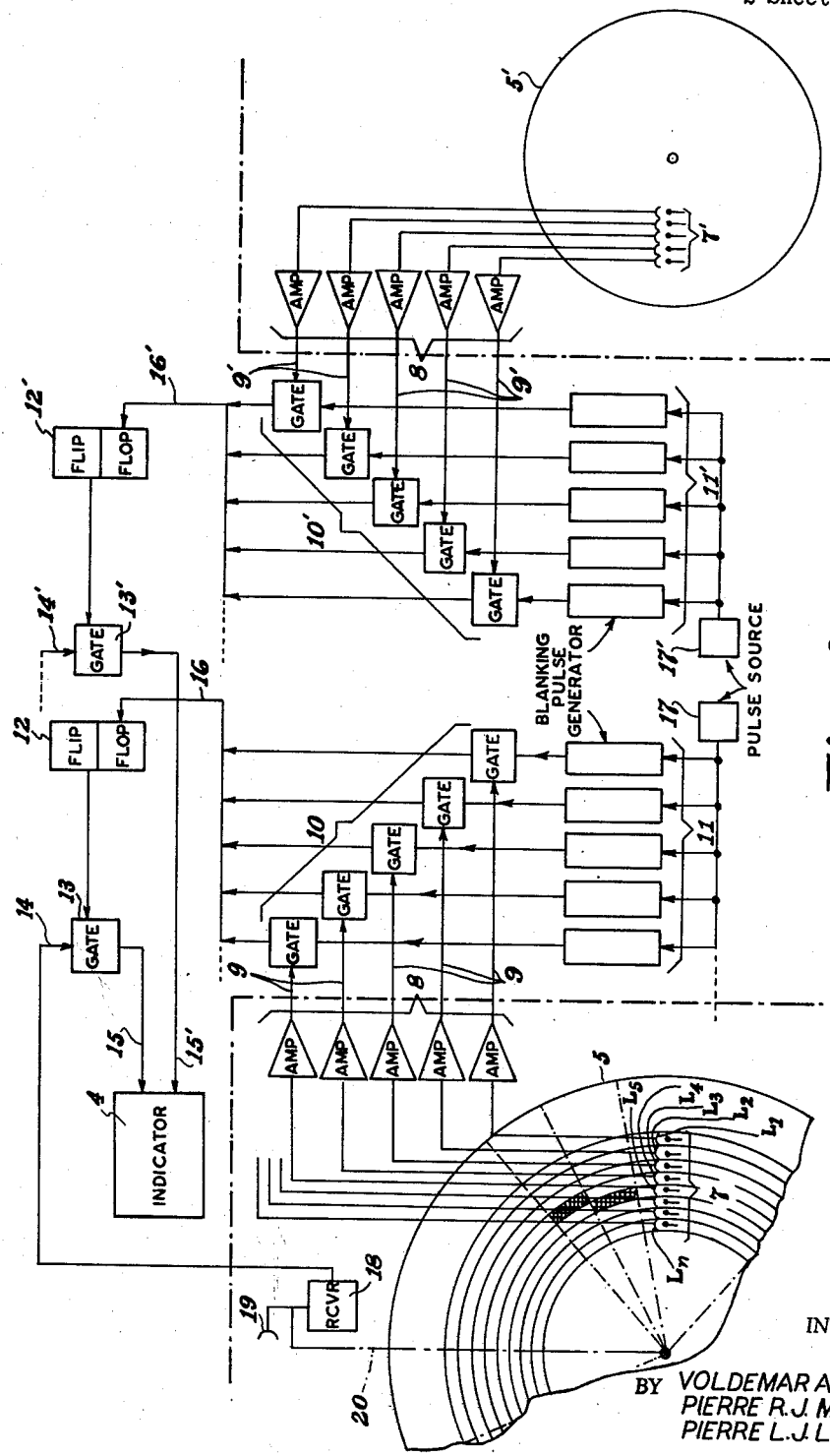

United States Patent Office 3,129,426
Patented Apr. 14, 1964

3,129,426
DISPLAY-MODIFYING APPARATUS FOR
RADAR SYSTEMS
Voldemar A. Altovsky, Pierre R. J. Mondon, and Pierre
L. J. L. Camerini, Paris, France, assignors to Societe
Nouvelle d'Electronique, a corporation of France
Filed Jan. 9, 1959, Ser. No. 785,895
Claims priority, application France Jan. 17, 1958
5 Claims. (Cl. 343—17.1)

Our present invention relates to an apparatus for modifying the display on the observation screen of a visual indicator in a pulse-type radar system provided with a rotary directive antenna.

Such radar systems are conventionally provided with indicator screens giving, for example, a panoramic display of the survey terrain on which the location of pulse-reflecting objects is ascertainable in polar co-ordinates, i.e. in terms of distance from the observation point and azimuthal angle with a given reference direction. Also known are display indicators giving the locations of reflecting objects in terms of distance and elevation above ground.

It is frequently desirable to blank out selected zones of the display, e.g. for the purpose of suppressing echoes from fixed objects whose location is of no interest to the observer, or to create on the display artificial visual indications simulating the presence of reflecting objects at selected locations. Known systems have solved only imperfectly the problem of confining such blanking or simulated echo pulses to specific zones of the observation screen.

It is, therefore, the general object of our invention to provide an improved apparatus for modifying the operation of a display indicator in a radar system at selected zones whose locations may be conveniently altered to suit particular requirements.

In accordance with this invention we provide a program carrier, such as a rotating disk, which is displaceable in synchronism with the directive antenna of the system and independently controls a plurality of signal generators for producing respective output signals, preferably a set of photocells, in timed relationship with the sweep of the antenna and, therefore, in predetermined positions thereof. A source of control pulses actuates a plurality of pulse generators whose outputs are trains of rectangular pulses so timed as to coincide with the passage of the luminous trace of the display indicator between predetermined limits in the direction of high-speed scanning displacement, i.e. radially in the case of a panoramic indicator, to determine the extent of a zone of artificially altered echo characteristics with reference to one of its co-ordinates (e.g. distance); the other co-ordinate (e.g. azimuth or elevation) is determined by the aforementioned output signals controlling the time interval during which a respective generator of rectangular pulses is operative to create the altered condition.

The above and other features and advantages of our invention will become more fully apparent from the following detailed description given with reference to the accompanying drawing in which:

FIG. 3 is a circuit diagram of the apparatus incorporating the program disk of FIG. 2b;

FIG. 1 shows the elevational pattern of an antenna of a radar system having three lobes 1, 2 and 3. The observation point, indicated at O, represents the origin of a co-ordinate system having the distance $d$ as its abscissa and the height $h$ as its ordinate.

Let it be assumed that a reflecting object is present at a location X in which the lobes 1 and 2 overlap. Under these circumstances it will be desirable to blank out the echo from one of the overlapping lobes, e.g. lobe 1, between the limits $a$ and $b$ of the area of interference. This can be done, without suppression of other portions of the radar sweep, by the apparatus described hereinafter.

Figure 2A:
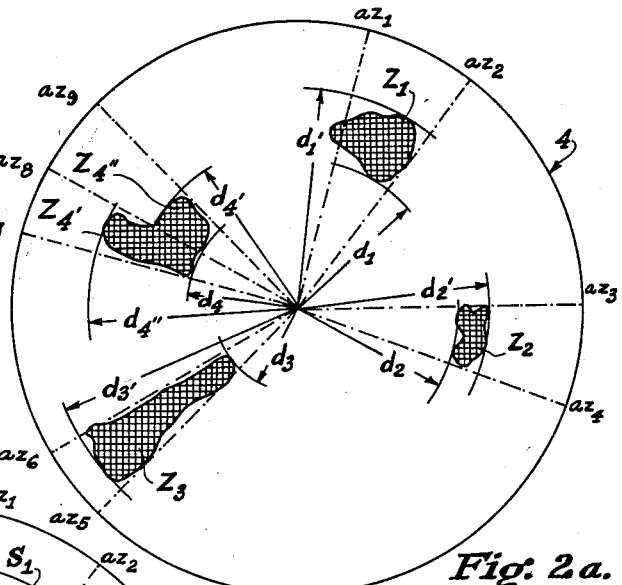
FIG. 2a is a diagrammatic view of the display appearing on a panoramic indicator of a radar system in its unmodified condition.

FIG. 2a shows a panoramic display of a circular screen 4 on which undesirable disturbances, due for example to fixed reflecting objects, appear at specific locations $Z_1$, $Z_2$, $Z_3$, $Z_4$. Zone $Z_1$ extends between azimuthal boundaries represented by radii $az_1$ and $az_2$, its proximal and distal limits and distance being shown at $d_1$ and $d_1'$, respectively. Zone $Z_2$ and $Z_3$ are similarly bracketed by radii $az_3$, $az_4$, and $az_5$, $az_6$ as well as distance arcs $d_2$, $d_2'$ and $d_3$, $d_3'$, respectively. Zone 4, which is of more complex configuration, is regarded as being subdivided into two subzones $Z_4'$ and $Z_4''$; the former extends between radii $az_7$, $az_8$ and arcs $d_4$, $d_4'$ whereas the latter is bounded by radii $az_8$, $az_9$ and, roughly, arcs $d_4$ and $d_4''$.

Figure 2B:
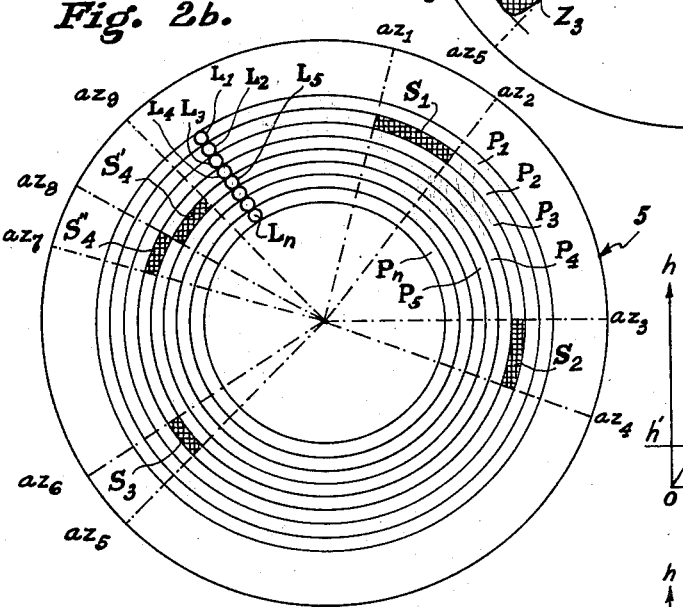
FIG. 2b is a somewhat diagrammatic plan view of a program disk forming part of a display-modifying apparatus according to the invention.

Reference is now made to FIG. 2b for a description of a program carrier adapted to be used in the blanking of the areas on screen 4 containing the zones $Z_1$–$Z_4$. This carrier comprises a disk 5 on whose surface the same azimuths $az_1$–$az_9$ have been plotted as in FIG. 2a. The disk surface is further subdivided into a plurality of concentric annular tracks $p_1$, $p_2$, $p_3$, $p_4$, $p_5$ ... $p_n$ which are respectively assigned to the different zones and subzones of FIG. 2a but whose locations on the disk 5 are not related to the distances of these zones from the center of the screen. It will be noted that each track $p_1$–$p_n$ of the otherwise transparent disk 5 is provided with an opaque portion extending between the angular limits of the corresponding zone, i.e. $az_1$ and $az_2$ for portion $S_1$ on track $p_1$, $az_3$ and $az_4$ for portion $S_2$ on track $p_2$, $az_5$ and $az_6$ for portions $S_3$ on track $p_3$, $az_7$ and $az_8$ for portion $S_4'$ on track $p_4$ and $az_8$, $az_9$ for portion $S_4''$ on track $p_5$. Also shown in FIG. 2b are the positions of a plurality of photoelectric transducer elements or cells $L_1$, $L_2$, $L_3$, $L_4$, $L_5$ ... $L_n$ respectively aligned with the tracks $p_1$–$p_n$, these photocells being positioned along a radius which may be regarded as the reference direction for the several azimuths referred to.

In FIG. 3 the disk 5 with its tracks $p_1$–$p_n$ is shown included in an apparatus comprising a set of amplifiers 8 respectively connected to the outputs of the bank of photocells $L_1$–$L_n$ which have been generally designated by the numeral 7. These photocells, when illuminated by a suitable light source (not shown) through the respective tracks, produce gating signals which after amplification by the devices 8 are transmitted via respective conductors 9 to the control electrodes of a series of gates 10. A source of control pulses 17 is connected in parallel to the inputs of a bank of blanking-pulse generators 11 which produce rectangular pulses that are transmitted to a conductor via the gates 10 respectively associated therewith. It will be noted that each gate 10 operates as an "AND" circuit for a particular generator 11 and conductor 9 associated with it and that these gates open at different times since, as shown in FIG. 2b, the opaque track portions $S_1$, $S_2$ etc. are disposed in relatively staggered, non-overlapping relationship. Each gate 10, when unblocked by a signal from the associated photocell 7 under the control of an opaque portion of the track scanned by such photocell, remains conductive for the duration of the alignment of the opaque track portion with the cell. Since, as is well known, the disk 5 rotates at a rate that is relatively slow in comparison with the radial sweep of the luminous trace of the indicator on display screen 4 (FIG. 2a), and since each blanking pulse will be in existence for only a fraction of this radial sweep as determined by the radial extent of the zones $Z_1$, $Z_2$ etc. to be blanked, a train of such pulses will reach the conductor 16 during an open interval of the associated gate 10.

Figure 5:
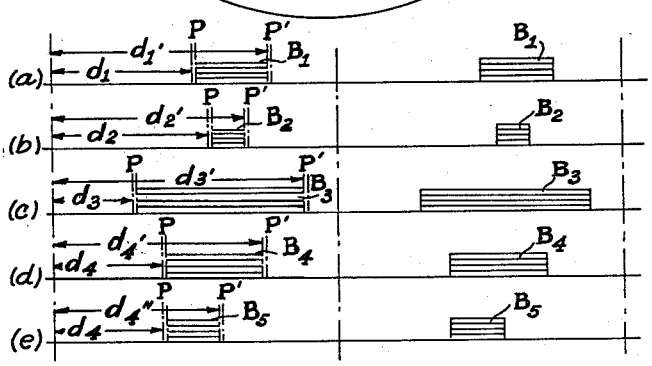
FIG. 5 is a set of graphs serving to explain the mode of operation of the apparatus of FIG. 3.

Reference is made to FIG. 5 in which the rectangular blanking pulses produced by the generators 11 have been illustrated at $B_1$, $B_2$, $B_3$, $B_4$ and $B_5$. Each of these blanking pulses is generated in response to a pair of control pulses P, P' which represent the output of source 17 delayed in accordance with the desired timing of the blanking pulse. Thus, the two pulses P, P' in FIG. 5(a) have timed delays $d_1$, $d_1'$ corresponding to the similarly designated distances relating to zone $Z_1$ in FIG. 2a. By the same token the delay times of corresponding pulse pairs in graphs (b) to (e) of FIG. 5 correspond to the distances $d_2$, $d_2'$; $d_3$, $d_3'$; $d_4$, $d_4'$; and $d_4$, $d_4''$.

The pulses $B_1$, $B_2$ etc. from generators 11, having been delivered to the conductor 16 via the corresponding gates 10, actuate a bistable circuit or flip-flop 12 which is triggered into an off-normal condition by the leading edge of an incoming blanking pulse and is restored to its normal condition by the trailing edge thereof. The output of flip-flop 12 is connected to a control electrode of a gate 13 to which video signals are supplied from the receiving section of a radar station 18 for the operation of the display indicator 4. The output lead 15 of gate 13, terminating at the display indicator, receives these video pulses only as long as the flip-flop 12 is in its normal condition; when it is off normal, the gate 13 is blocked and no echo pulses are made visible by the indicator. It will thus be seen that the display indicator is blanked within selected limits of azimuth and distance roughly corresponding to the outline of a zone from which echo signals are to be suppressed. It will be apparent that, conversely, the indicator 4 could also be operated to give a visual display of simulated echo signals from a zone so selected.

As indicated diagrammatically at 20, the antenna 19 of the radar receiver 18 is rotated in unison with the disk 5 which is driven by suitable means not further illustrated.

Figure 1:
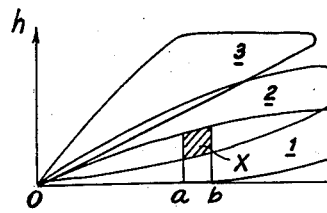
FIG. 1 is a diagram illustrating the elevational pattern of a multilobe radar antenna.

FIG. 3 also shows a second program disk 5' forming part of the apparatus, the associated elements 7'–17' functioning in a manner analogous to that of the correspondingly numbered unprimed elements described above. Thus, the two disks 5 and 5' may be respectively used to control reception from different lobes of the pattern of antenna 19, e.g. the low-elevation lobe 1 and the medium-elevation lobe 2 shown in FIG. 1.

Figure 4A:
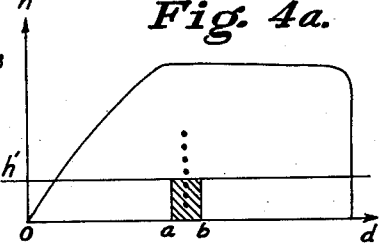
FIGS. 4a and 4b are diagrams of the display of a different type of indicators adapted to be used with an apparatus according to the invention.
Figure 4B:
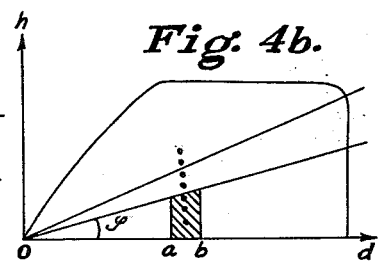

FIGS. 4a and 4b show a display in a vertical plane which may be used in association with the azimuthal display of panoramic indicator 4 to give a three-dimensional bearing of the location of a reflecting object. In such three-dimensional system the elevation of the beam emitted by the antenna 19 may be changed at a rapid rate, as indicated by the vertically aligned dots in FIGS. 4a and 4b to yield a display in which the coordinates are distance $d$ and height $h$ (FIG. 4a) or distance $d$ and elevational angle $\varphi$ (4b). Selective application of the blanking pulses to a particular range of beam elevations will result in the suppression of echoes from only a limited portion of the pattern in FIGS. 4a and 4b, e.g. below level $h'$ and between distance limits $a$, $b$ in FIG. 4a or below angle of elevation $\varphi$ and within the same distance limits in FIG. 4b.

It will be understood that program carriers other than disks with transluminated tracks of varying light transmissivity (e.g. magnetic tapes or drums) may be used in a system according to the invention and that further modifications of the specific embodiments described and illustrated may be made without departing from the spirit and scope of the invention as defined in the appended claims.

What is claimed is:

1. In a radar system provided with means including a rotary directive antenna for transmitting high-frequency pulses and receiving their echoes to control a display indicator, the combination therewith of an apparatus for modifying the operation of said indicator to create zones of artificially altered echo characteristics on the display thereof; said apparatus comprising a program carrier displaceable in synchronism with said directive antenna, a plurality of signal generators independently controlled by said carrier for producing a plurality of relatively staggered output signals in timed relationship with the sweep of said antenna in predetermined azimuthal positions thereof, a source of control pulses, a plurality of pulse generators connected in parallel to said source for producing trains of rectangular pulses in response to said control pulses, each of said pulse generators being connected to a respective one of said signal generators for producing said rectangular pulses only in the presence of an output signal from the associated signal generator, pulse-responsive control means for said indicator, and circuit means for applying the rectangular pulses from all of said pulse generators to said control means.

2. In a radar system provided with means including a rotary directive antenna for transmitting high-frequency pulses and receiving their echoes to control a display indicator, the combination therewith of an apparatus for modifying the operation of said indicator to create echo-free zones on the display thereof; said apparatus comprising a program carrier displaceable in synchronism with said directive antenna, a plurality of signal generators independently controlled by said carrier for producing a plurality of relatively staggered output signals in timed relationship with the sweep of said antenna in predetermined azimuthal positions thereof, a source of control pulses, a plurality of blanking-pulse generators connected in parallel to said source for producing trains of rectangular pulses in response to said control pulses, each of said blanking-pulse generators being connected to a respective one of said signal generators for producing said rectangular pulses only in the presence of an output signal from the associated signal generator, pulse-responsive means for controlling the passage of echo signals from said antenna to said indicator, and circuit means for applying the rectangular pulses from all of said blanking-pulse generators to said pulse-responsive means for temporarily blocking such passage upon the occurrence of said rectangular pulses.

3. In a radar system provided with means including a rotary directive antenna for transmitting high-frequency pulses and receiving their echoes to control a display indicator, the combination therewith of an apparatus for modifying the operation of said indicator to create zones of artificially altered echo characteristics on the display thereof; said apparatus comprising a program carrier with a plurality of tracks of varying light transmissivity displaceable in synchronism with said directive antenna, a plurality of photoelectric transducers respectively aligned with said tracks for translumination therethrough whereby a plurality of relatively staggered output signals are produced in timed relationship with the sweep of said antenna in predetermined azimuthal positions thereof, a source of control pulses, a plurality of pulse generators connected in parallel to said source for producing trains of rectangular pulses in response to said control pulses, each of said pulse generators being connected to a respective one of said transducers for producing said rectangular pulses only in the presence of an output signal from the associated transducer, pulse-responsive control means for said indicator, and circuit means for applying the rectangular pulses from all of said pulse generators to said control means.

4. In a radar system provided with means including a rotary directive antenna for transmitting high-frequency pulses and receiving their echoes to control a panoramic display indicator, the combination therewith of an apparatus for modifying the operation of said indicator to create echo-free zones on the display thereof; said apparatus comprising a program carrier with a plurality of tracks of varying light transmissivity rotatable in synchronism with said directive antenna, a plurality of photoelectric transducers respectively aligned with said tracks for translumination therethrough whereby a plurality of relatively staggered output signals are produced in timed relationship with the sweep of said antenna in predetermined azimuthal positions thereof, a source of control pulses, a plurality of blanking-pulse generators connected in parallel to said source for producing trains of rectangular pulses in response to said control pulses, each of said blanking-pulse generators being connected to a respective one of said transducers for producing said rectangular pulses only in the presence of an output signal from the associated transducer, pulse-responsive means for controlling the passage of echo signals from said antenna to said indicator, and circuit means for applying the rectangular pulses from all of said blanking-pulse generators to said pulse-responsive means for temporarily blocking such passage upon the occurrence of said rectangular pulses.

5. In a radar system provided with means including a rotary directive antenna for transmitting high-frequency pulses and receiving their echoes in a multilobe pattern to control a panoramic display indicator, the combination therewith of an apparatus for modifying the operation of said indicator to create echo-free zones on the display thereof; said apparatus comprising a plurality of program carriers rotatable in synchronism with said directive antenna, a bank of signal generators independently controlled by each of said carriers for producing a plurality of relatively staggered output signals in timed relationship with the sweep of said antenna in predetermined azimuthal positions thereof, a source of control pulses associated with each of said carriers, a bank of blanking-pulse generators for each of said carriers connected in parallel to the respective source for producing trains of rectangular pulses in response to said control pulses, each of said blanking-pulse generators being connected to a respective one of said signal generators controlled by the associated carrier for producing said rectangular pulses only in the presence of an output signal from the associated signal generator, a plurality of pulse-responsive devices for controlling the passage of echo signals pertaining to respective lobes of said pattern from said antenna to said indicator, and circuit means for applying the rectangular pulses from each bank of blanking-pulse generators to a respective pulse-responsive device for blocking such passage upon the occurrence of said rectangular pulses.

References Cited in the file of this patent
UNITED STATES PATENTS

| 2,410,424 | Brown | Nov. 5, 1946 |
| 2,532,566 | Millman | Dec. 5, 1950 |
| 2,535,274 | Dicke | Dec. 26, 1950 |
| 2,668,286 | White | Feb. 2, 1954 |
| 2,682,048 | Longacre | June 22, 1954 |
| 2,882,525 | Young | Apr. 14, 1959 |

FOREIGN PATENTS

| 644,736 | Great Britain | Oct. 18, 1950 |